UNITED STATES PATENT OFFICE.

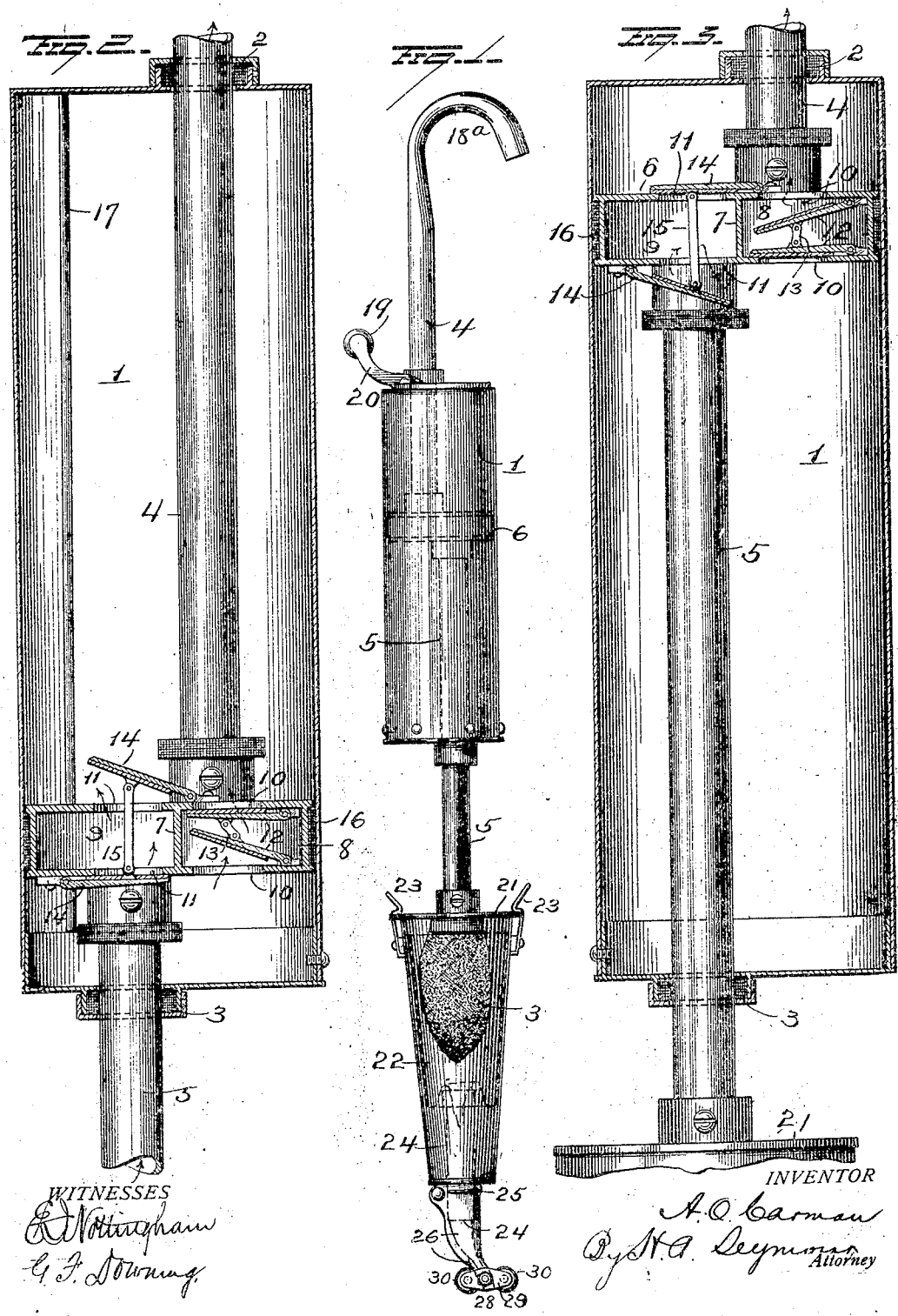

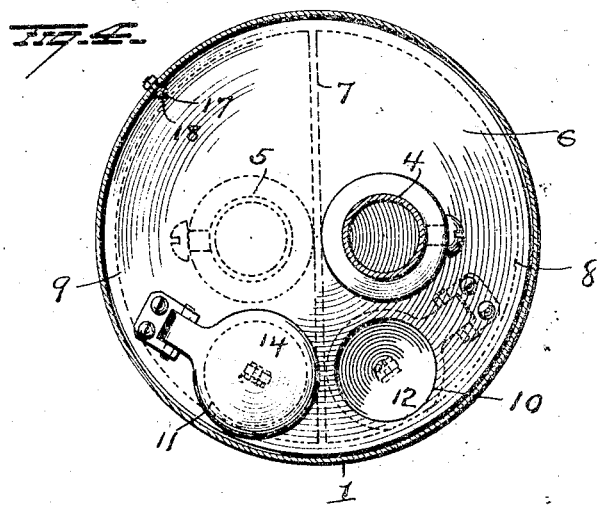
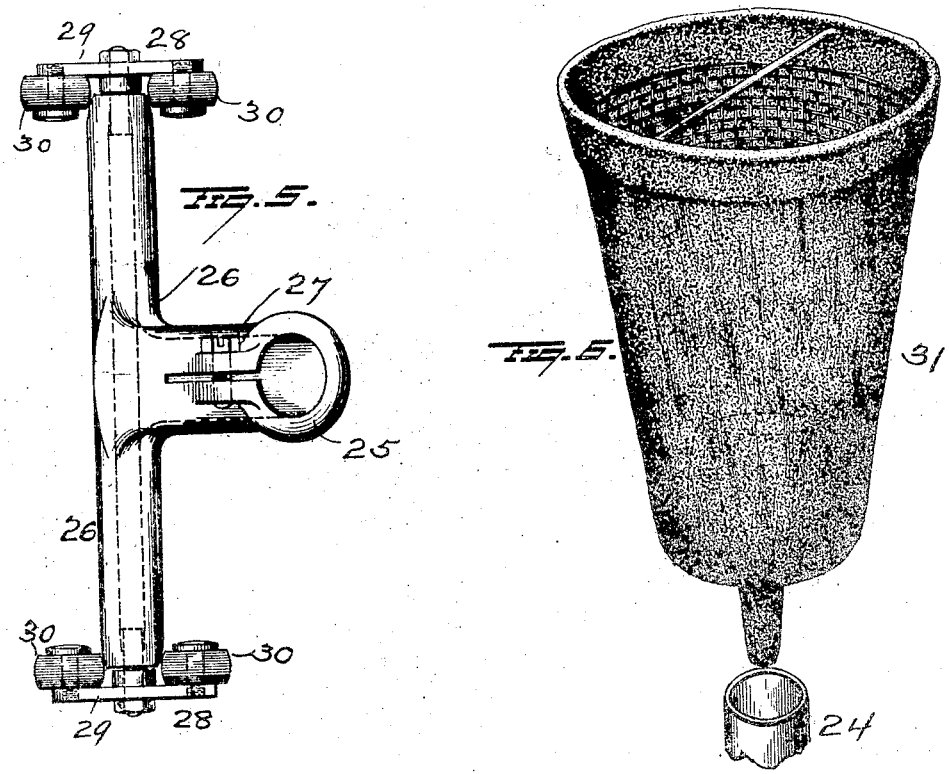

ALVIN O. CARMAN, OF TEKONSHA, MICHIGAN.

VACUUM-CLEANER.

1,119,747. Specification of Letters Patent. Patented Dec. 1, 1914.

Application filed July 2, 1913. Serial No. 777,131.

*To all whom it may concern:*

Be it known that I, ALVIN O. CARMAN, of Tekonsha, in the county of Calhoun and State of Michigan, have invented certain new and useful Improvements in Vacuum-Cleaners; and I do hereby declare the following to be a full, clear, and exact description of the invention, such as will enable others skilled in the art to which it appertains to make and use the same.

This invention relates to improvement in vacuum cleaners, and more particularly to such as are adapted for use in removing dust, etc., from floors, carpet or other floor coverings and the like,—one object of the invention being to so construct a device of this character that it may be conveniently handled and operated for domestic use, with the expenditure of a minimum amount of exertion.

A further object is to simplify the construction of devices of the character specified and at the same time, to so construct the same that it shall be sure and accurate in operation and not liable to get out of order.

With these and other objects in view, the invention consists in certain novel features of construction and combinations of parts as hereinafter set forth and pointed out in the claim.

In the accompanying drawings; Figure 1 is a view of a hand-operated vacuum cleaner embodying my improvements, a portion of the dust receptacle being broken away; Figs. 2 and 3 are enlarged sectional views illustrating the suction devices; Fig. 4 is a horizontal sectional view taken above the piston; Fig. 5 is a detail view of the nozzle showing the roller mountings therefor, and Fig 6 is a separate view of the dust strainer.

1 represents a cylinder provided at its ends with packing boxes 2—3 for the accommodation of two pipes 4—5, said pipes being connected with a piston 6 located within the cylinder.

The piston 6 is made hollow and divided by a partition 7 into two chambers 8—9 with which the pipes 4—5 respectively communicate. The upper and lower walls of the chamber 8 are provided with ports 10 communicating with the interior of the cylinder and the upper and lower walls of the chamber 9 are likewise made with ports 11 which also communicate with the interior of the cylinder.

Located within the chamber 8 are two hinged valves 12—12 for the ports 10, and these valves are connected by a link 13 pivotally attached at its ends to the respective valves,—said link being of such length that when one of said valves is closed, the other will be open. Valves 14—14 for the ports 11 are hinged to the top and bottom faces of the piston 6 and are connected by a link 15 pivotally attached at its ends to said valves 14 and passing through the piston chamber 9 and the ports 11, said link being of such length to permit one of said valves to close when the other is open. The links 13 and 15 also serve to force one valve to close when the other opens and vice versa and thus prevent possibility of faulty operation on account of sticking of the valves.

The piston 6 is provided with a suitable peripheral packing 16 and in order to prevent the cylinder from rotary movement on the piston, a rod or bead 17 is provided within the cylinder to move in a groove 18 disposed transversely across the peripheral wall of the piston.

The upper end of the tubular rod or pipe 4 may be bent to form a handle 18ª and a handle 19 is secured, by means of arms 20, to the upper end of the cylinder, whereby the latter may be reciprocated on the two tubular rods or tubes 4—5 and cause a continuous flow of air upwardly through the same, by reason of the coöperation of said cylinder with the valved piston with which the tubes communicate.

A flanged disk 21 is rigidly secured to the lower end of the lower tubular rod or tube 5, and receives the upper end of a conical dust receptacle 22, the latter being removably attached to said disk by means of spring jaws 23. The lower end of the dust receptacle is provided with a short pipe section 24, which projects upwardly within said receptacle and to the depending end of this pipe section, the tubular shank 25 of an elongated nozzle 26, is secured by clamping means such as indicated at 27. At respective ends of the nozzle 26, two-wheeled trucks 28 are located; each of said trucks comprising a bar 29 pivotally attached between its ends to an end of the nozzle and having rollers 30 mounted at its respective ends to run on the surface to be cleaned,—the rollers being thus arranged in front and in rear of the nozzle and affording means to maintain the mouth in proper relation to the surface to be cleaned and at the same time permit the device as a whole to be rocked more or less during the operation of the same.

Within the dust receptacle a dust screen 31 is removably disposed and may consist of a conical cage of woven wire covered with fabric, the lower portion of which latter projects upwardly through the bottom of the cage and receives the upper end of the pipe section 24.

By moving the nozzle over the surface to be cleaned and at the same time reciprocating the cylinder 1 on the valved piston 6, a continuous upward flow of air through the tubes will be caused and the suction thus created at the mouth of the nozzle will cause dust etc. to enter said nozzle and find its way to the dust chamber.

My improvements are simple in construction and may be operated effectually with minimum exertion.

Slight changes might be made in the details of construction of my invention without departing from the spirit thereof or limiting its scope and hence I do not wish to restrict myself to the precise details herein set forth.

Having fully described my invention what I claim as new and desire to secure by Letters Patent, is:—

In a vacuum cleaner, the combination with a pump provided with a pipe depending therefrom, a dust receptacle carried by the lower end of the pump pipe, and a pipe communicating with and depending from the dust receptacle, of an elongated nozzle carried by said last-mentioned pipe, and trucks at respective ends of said nozzle, each truck pivotally connected between its ends to the nozzle and having its wheels disposed one in front of another.

In testimony whereof, I have signed this specification in the presence of two subscribing witnesses.

ALVIN O. CARMAN.

Witnesses:
 EDWARD E. HARWOOD,
 E. L. CARMAN.